Aug. 14, 1962 A. STAMBERA 3,049,268
APPARATUS FOR DISCHARGING BULK MATERIAL IN
GRANULAR OR POWDERY STATE
Filed Feb. 14, 1958 4 Sheets-Sheet 1

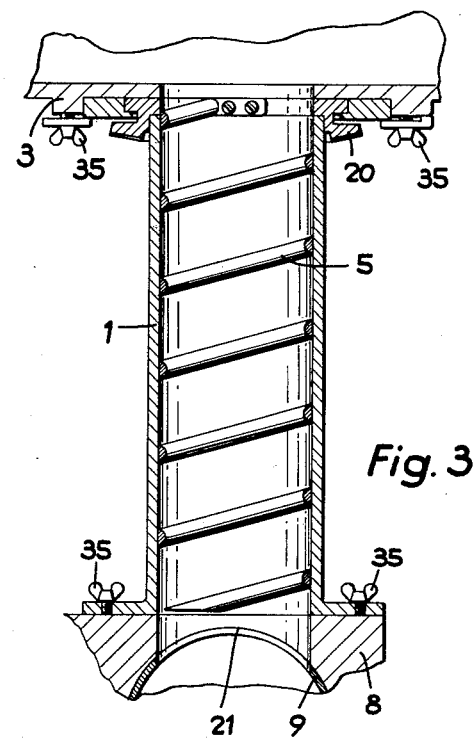
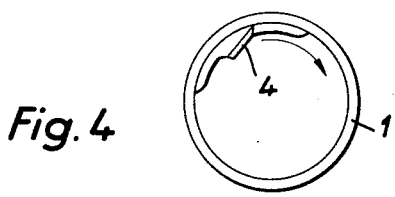
Fig. 3
Fig. 4

United States Patent Office 3,049,268
Patented Aug. 14, 1962

3,049,268
APPARATUS FOR DISCHARGING BULK MATERIAL IN GRANULAR OR POWDERY STATE
Adolf Stambera, Stuttgart-Bad Cannstatt, Germany, assignor to Firma Fr. Hesser, Maschinenfabrik-Aktiengesellschaft, Stuttgart-Bad Cannstatt, Germany, a corporation of Germany
Filed Feb. 14, 1958, Ser. No. 715,473
6 Claims. (Cl. 222—227)

The invention relates to an improved apparatus for discharging bulk material in granular or powdery state tending to stick and to agglomerate or to form lumps to an automatic weighting machine or like measuring device.

Especially but not exclusively for weighing out, measuring out and discharging of granular and powdery bulk material which tends very much to stick and to agglomerate to parts of the apparatus or to form lumps as is often the case with cake mix, foodstuff, special kinds of cocoa and the like materials, it has been found that the feeding apparatus used heretofore and which comprises feeding worms, feeding wheels, feeding conveyors, shaking conduits or the like will fail after a short time since the materials named above cling to all parts or portions of said apparatus whether they are fixedly or movably mounted, so that so-called bridges will be formed and thereby free passage is prevented. This is true especially in a high degree for such parts of said apparatus which are used for discharging the small finishing stream of the above materials for weighing out the exact final amount of the weight desired, which parts correspondingly are of rather small cross sectioned areas only for the discharge passage.

According to the essential features of the invention the disadvantages of known apparatus are overcome by arranging stirring means known per se adjoining the outlet of the discharge canal which is connected at will either with a distributing device or directly to the supply tank and the feeding hopper, respectively, and by rotatably holding such stirring means around an axis at right angles to the feeding apparatus, the rotating portion of the stirring means comprising a number of at least two knife-like scrapers or the like connected to the driving spindle of the stirring means, the longitudinal front or leading edges of said knife-like scrapers being resiliently fitted close to the inner surface of the wall of the box for the stirring means, which box wall includes inlet and outlet openings, and by arranging means for the outlet opening to be shut by a flap, slide or the like controlled by the automatic weighing machine or measuring device, as the case may be, and including a further opening or gap for discharging the small finishing stream of the above materials.

To prevent any jamming within the discharge canal which is preferably of cylindrical form, according to the invention there are rotatingly arranged within said canal one or more knives or blades, the length of which conform to the total length of the discharge canal. Instead of such knives or blades there can be used a coil, e.g. in the form of a spring the general diameter of which will be chosen so that said coil is rotated within the discharge canal sliding fittingly or with slight restraint against the inner wall of said canal.

By such rotating knives, blades or coils not only any sticking or clinging of the above materials within the discharge canal will be safely prevented, but especially the formation of so-called bridges of such materials at the inlet part of same also is prevented. Moreover, the rotatable coil assists the discharging action in a downward direction without effecting any appreciable pressure to the above materials even in case only the small opening or gap of the flap named above will be left for discharging the small finishing stream of bulk materials.

A preferred embodiment of a feeding apparatus according to the invention is illustrated in the accompanying drawings. Such preferred embodiment is not by way of limitation of the invention but is given for explanation purposes only.

FIG. 1 of the drawings is a front view partly in section of the essential portions of a feeding apparatus according to the invention using two distributing or feeding tubes.

FIG. 3 is a front view partly broken away and in section showing the feeding canal of one feeding tube with a rotatably arranged coil of wire.

FIG. 4 is a view from above showing the feeding canal of one of the feeding tubes with a rotatably arranged knife or blade.

Figure 1:
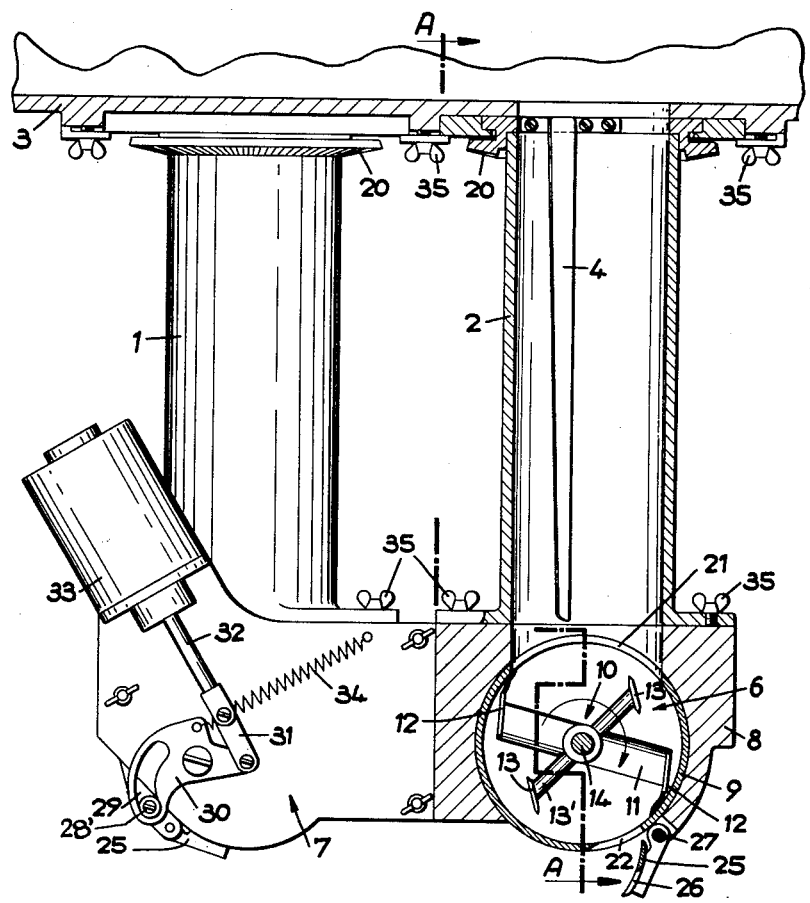
Figure 2:
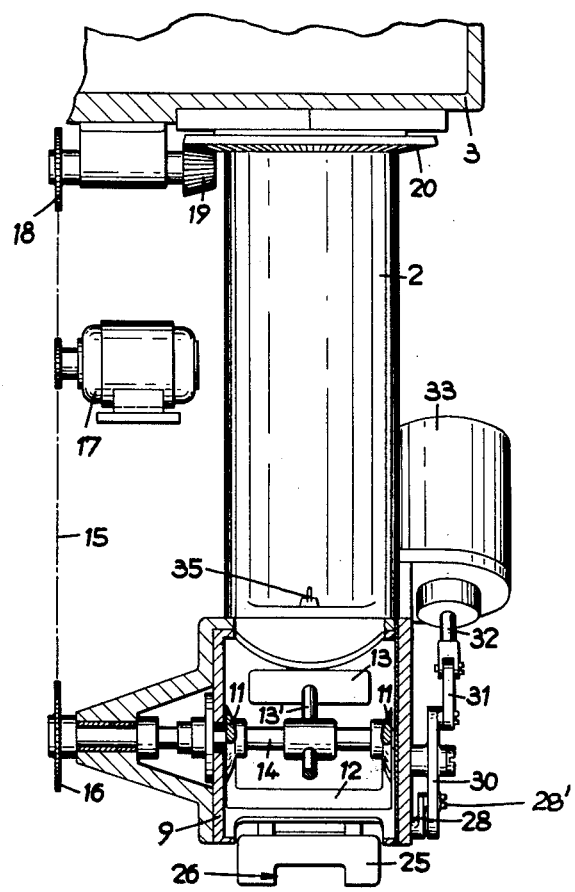
FIG. 2 is a view in section taken on line A—A of FIG. 1.

According to FIGURES 1 and 2 the preferred embodiment of the invention comprises two feeding tubes 1 and 2 connected to a common distributing plate 3 from which the bulk material is fed in a uniform manner to both feeding tubes. Within each of the feeding tubes 1 and 2 there is rotatably arranged a knife or blade 4 in touch with the inner surface of the corresponding feeding tube, the length of each knife or blade 4 corresponding to the total length of each feeding tube 1 and 2.

Each knife or blade 4 is driven by a coordinated bevel gear 20 rotatably carried by said distributing plate 3.

It is to be understood that two or more of such knives or blades 4 may be used for each feeding tube as the case may be.

According to FIG. 3 instead of knives or blades 4 a coil 5 may be used within the feeding tubes 1 and/or 2 which coil preferably may be a spring wound in spiral form from suitable steel wire. The turns of such coil are flattened externally by grinding the outer diameter of the spiral spring. The coil 5 is secured to the bevel gear 20 and is touching with close fit and preferably with restraint against the inner wall of the coordinated feeding tube.

At the lower end of each feeding tube 1 and 2 there are arranged stirring means 6 and 7, respectively, within a box 8 including both stirring means 6 and 7. Such stirring means serve for the purpose to change the consistency of the bulk material from a nearly flowable and mostly lumpy state to a uniformly flowable feeding stream. For this aim both of the stirring means 6 and 7 comprise each a cylindrical inset 9 with a relatively thin wall fixed conjointly within the box 8 as well as a rotatably carried rotor 10 the axis of which is arranged at right angles to the feeding and distributing direction, the rotor 10 being fixed to a spindle 14 rotatably carried by box 8 and inset 9. Each rotor 10 comprises a framelike formation with two radial bars or rods 11 and two scrapers 12 connecting the latter. Scrapers 12 are resiliently fitted with their longitudinal leading edges within the inner wall of inset 9. Moreover, rotor 10 comprises two scrapers 13 arranged parallel and with an oblique angle with respect to spindle 14 and are fixed each to a bar or rod 13'. Both scrapers 13 are revolving with a certain distance from the inner wall of inset 9.

Rotor 10 is driven from an electro-motor 17 by chain 15 and chain wheel 16 fixed to spindle 14 (FIG. 2). Electro-motor 17 serves at the same time as a drive for the bevel gear 20 with knives or blades 4 and coil 5, respectively, by chain 15 and chain wheel 18 connected to a bevel gear 19.

The bulk material will be introduced into and discharged out of the stirring means 6 and 7, respectively, by an inlet opening 21 and an outlet opening 22, respectively, the outlet opening 22 being provided at the lower part of inset 9 and fully opened during the discharge of the main or coarse stream of the bulk material, but partly closed during the discharge of the final or small stream of the bulk material by a flap 25 comprising a small opening or gap 26. Flap 25 is attached to a spindle 27 rotatably carried by box 8. A lever 28 is secured to spindle 27, and a finger 28 is in engagement with an arcuate slot 29 of a member 30 pivotally carried by box 8. Member 30 is connected by a link 31 to the armature 32 of an electro-magnet 33 fixed to box 8. Member 30 is connected to a tension spring 34 acting to close the outlet opening 22 by flap 25 as soon as the electro-magnet 33 has been switched off according to a control the details of which will be given below. In closed position of flap 25 the small finishing discharge stream will be fed through the small opening or gap 26 only. Discharge of such finishing stream will be continued until electro-motor 17 will be switched off by the weighing-machine after the exact filling weight has been reached.

Figure 5:
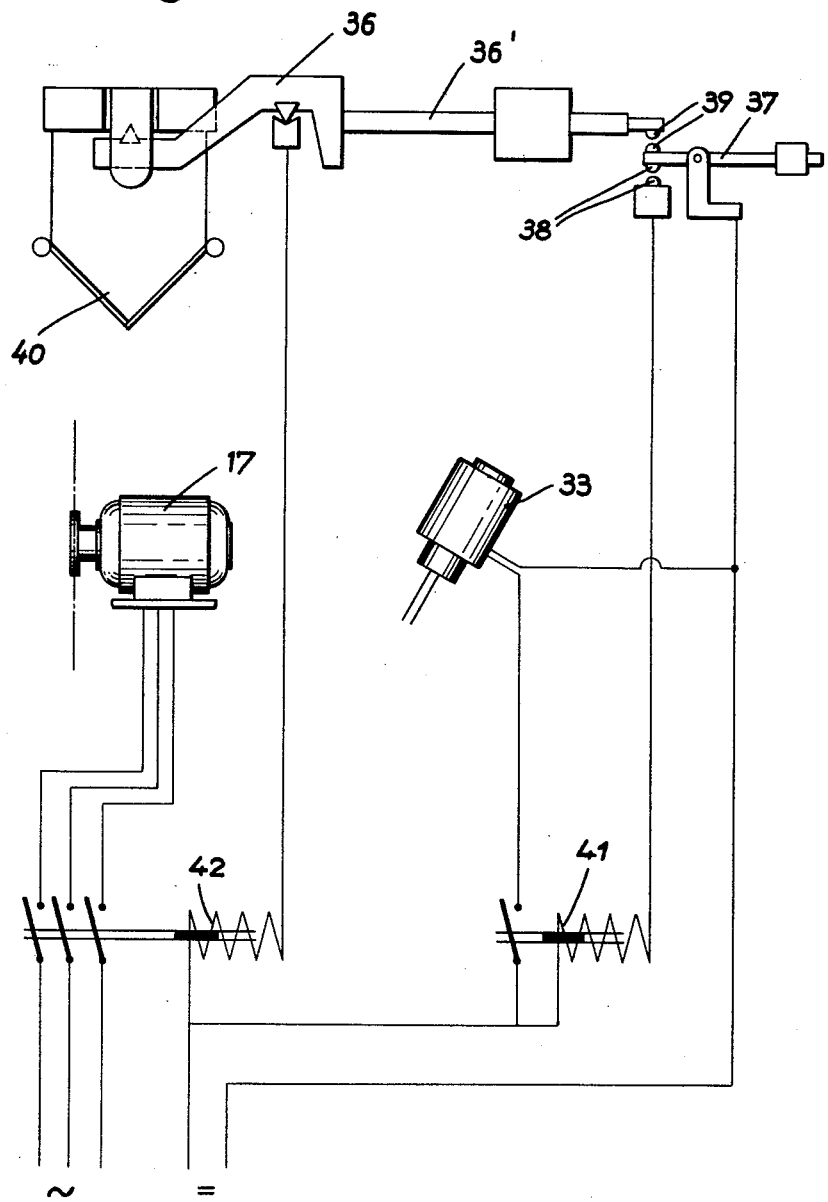
FIG. 5 is a diagrammatic view of a preferred mechanical and electrical control circuit for the improved discharging apparatus according to the invention.

According to FIG. 5 the automatic weighing machine 36 comprises a weighing arm 36' and a weighing scale 40 as known per se for weighing and discharging the bulk material incoming from the discharge apparatus of the invention.

Moreover, a supplemental weighing arm 37 is arranged in combination with the weighing machine serving to control the switching off and on, respectively, of electro-magnet 33 and of electro-motor 17 in the following way. When weighing scale 40 is empty both contacts 38 and 39 will be closed by arm 36', so that electro-magnet 33 and electro-motor 17 are connected to the network by coordinated relays 41 and 42, respectively. Thus, flaps 25 of feeding tubes 1 and 2 are opened and the stirring means 6 and 7 as well as knives 4 and coil 5, respectively, are rotating, so that the bulk material can be discharged into scale 40.

Shortly before reaching the balanced position the upward movement of weighing arm 36' opens contact 38 so that electro-magnet 33 will be switched off and flaps 25 will be shut or closed by the action of springs 34, while openings or gaps 26 of flaps 25 permit a continuous discharge of the small finishing stream of bulk material until the weighing machine 36 will be fully balanced and arm 36' opens contact 39. Thus, electro-motor 17 is switched off so that stirring means 6 and 7, knives 4 and coil 5, respectively, come to rest. After scale 40 has been discharged the aforesaid control cycle will be continued.

For performing a ready and simple cleaning of the feeding apparatus according to the invention and for removing any disturbance which may occur feeding tubes 1 and 2 together with their knives or blades 4 and coil 5, respectively, can conjointly be taken out of the apparatus after fixing screws or bolts 35 have been unscrewed from the distributing plate and box 8, respectively.

It is to be mentioned that the general features of construction and arrangement of the feeding apparatus according to the invention are by no means limited to the preferred example as described above in connection with the drawings. Thus it will be possible to use closing means for outlet opening 22 in the form of a swingable or shutter slide (not shown) for special materials to be discharged. Moreover, two or more knives or blades 4 might be used instead of one blade or knife only as shown in the drawings.

What is claimed is:

1. An apparatus for use in automatic metrological devices comprising a wall constituting a horizontally disposed cylindrical canal and including a relatively thin portion provided with a discharge outlet, a wall constituting a vertically disposed cylindrical discharge canal leading to said horizontally disposed canal, and revolvable stirring and scraping means operatively arranged within each of said canals, the axis of said horizontal canal being perpendicularly disposed relative to the axis of said vertical canal, the revolvable stirring and scraping means in the horizontal canal comprising a driving shaft, and a plurality of axially parallel knife-like scrapers connected to said driving shaft, said knife-like scrapers having front longitudinal edges elastically engaging the wall of said canal.

2. Apparatus according to claim 1, in which the revolvable scraping means in said vertical discharge canal comprises a spirally wound spring steel wire, the outer face of said wire being flat and fittingly touching the inner face of said canal.

3. Apparatus according to claim 1, in which the revolvable scraping means in said horizontal canal rotates in a determinable direction and comprises two ledges having longitudinal front edges inclined in said direction and adapted to fit resiliently close to the inner surface of said horizontal canal.

4. Apparatus according to claim 1, including further revolvable stirring means positioned within said horizontal canal and comprising ledges arranged at a distance from and with an obtuse angle in relation to the radius of said horizontal canal.

5. Apparatus according to claim 1 comprising a closing flap operatively associated with said discharge outlet and in which said closing flap defines a small gap allowing, after the closure of the flap, a small finishing discharge stream of material until the exact filling weight has been reached.

6. Apparatus according to claim 1, including a cylindrical inset in said horizontal canal cooperating with said scraping means.

References Cited in the file of this patent

UNITED STATES PATENTS

| | | |
|---|---|---|
| 1,001,562 | Smith | Aug. 22, 1911 |
| 1,152,820 | Kennicott | Sept. 7, 1915 |
| 1,279,021 | Scott | Sept. 18, 1918 |
| 1,490,817 | Garratt | Apr. 15, 1924 |
| 2,338,034 | Gemberling et al. | Dec. 28, 1943 |
| 2,674,396 | Peterson | Apr. 6, 1954 |
| 2,850,255 | Gould | Sept. 2, 1958 |
| 2,904,304 | Zwoyer et al. | Sept. 15, 1959 |

FOREIGN PATENTS

| | | |
|---|---|---|
| 21,335 | Great Britain | 1906 |
| 282,039 | Switzerland | July 16, 1952 |